United States Patent
Dinh et al.

(10) Patent No.: US 9,906,300 B2
(45) Date of Patent: Feb. 27, 2018

(54) OPTICALLY POWERED TRANSDUCER MODULE

(71) Applicant: Rosemount Aerospace Inc., Burnsville, MN (US)

(72) Inventors: Nghia T. Dinh, Burnsville, MN (US); Cuong Tho Huynh, Shakopee, MN (US); Scott D. Isebrand, Minneapolis, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 15/160,422

(22) Filed: May 20, 2016

(65) Prior Publication Data

US 2017/0338889 A1    Nov. 23, 2017

(51) Int. Cl.
- *H04B 10/00* (2013.01)
- *H04B 10/25* (2013.01)
- *H02J 7/35* (2006.01)
- *H02J 7/34* (2006.01)

(52) U.S. Cl.
CPC .............. *H04B 10/25* (2013.01); *H02J 7/355* (2013.01); *H02J 7/345* (2013.01)

(58) Field of Classification Search
USPC .......................................... 398/171, 109–110
See application file for complete search history.

(56) References Cited

U.S. PATENT DOCUMENTS

| | | | | |
|---|---|---|---|---|
| 4,820,916 A * | 4/1989 | Patriquin | ............. | H04B 10/807 250/208.2 |
| 4,963,729 A * | 10/1990 | Spillman | .................. | G01D 5/12 250/227.21 |
| 5,223,707 A * | 6/1993 | Bjork | .................. | G01D 5/2208 250/227.21 |
| 5,796,890 A | 8/1998 | Tsuji et al. | | |
| 6,014,076 A | 1/2000 | Luzzader | | |
| 6,744,036 B2 * | 6/2004 | Kline | .................. | G01F 23/0061 250/227.11 |

(Continued)

FOREIGN PATENT DOCUMENTS

| EP | 0290243 A2 | 11/1988 |
|---|---|---|
| EP | 0386965 A1 | 9/1990 |
| EP | 1406070 A1 | 4/2004 |

OTHER PUBLICATIONS

Extended European Search Report for EP Application No. 17162983.5, dated Nov. 7, 2017, 8 pages.

*Primary Examiner* — Agustin Bello
(74) *Attorney, Agent, or Firm* — Kinney & Lange, P.A.

(57) ABSTRACT

A sensor assembly comprises a remote data concentrator (RDC) and an optically powered transducer module (OPTM). The RDC transmits a first optical pulse including a parameter request signal along an optical fiber. The OPTM is connected to the optical fiber, and comprises a photodiode, an energy storage device, a sensor, a processor, and a laser. The photodiode receives the first optical pulse, and the energy storage device is charged by the photodiode. The sensor, processor, and laser are powered by discharging the energy storage device. The sensor senses a parameter specified by the parameter request signal. The processor generates a signal packet from the output of the first sensor. The laser transmits a second optical pulse including the signal packet along the optical fiber to the RDC.

19 Claims, 3 Drawing Sheets

(56) References Cited

U.S. PATENT DOCUMENTS

| | | | | |
|---|---|---|---|---|
| 6,800,867 B2* | 10/2004 | Maier | ................... | G01D 3/08 |
| | | | | 250/551 |
| 7,638,750 B2* | 12/2009 | Kline | ............... | H01L 31/02021 |
| | | | | 136/244 |
| 7,939,792 B2* | 5/2011 | Nyffenegger | ........ | G01D 5/2515 |
| | | | | 250/227.11 |
| 7,965,948 B1* | 6/2011 | Bugash | ............... | H04B 10/807 |
| | | | | 398/197 |
| 7,966,887 B2 | 6/2011 | Knobloch et al. | | |
| 8,917,996 B2* | 12/2014 | Belansky | ........... | H04B 10/0779 |
| | | | | 398/116 |
| 9,182,308 B2 | 11/2015 | Kurtz | | |
| 9,261,425 B2 | 2/2016 | Fahimi et al. | | |
| 2013/0336656 A1* | 12/2013 | Belansky | ........... | H04B 10/0779 |
| | | | | 398/79 |
| 2014/0166852 A1* | 6/2014 | Hauzeray | .............. | G01D 5/268 |
| | | | | 250/205 |
| 2015/0268416 A1* | 9/2015 | Coffey | .................. | G01D 5/268 |
| | | | | 250/227.11 |

* cited by examiner

OPTICALLY POWERED TRANSDUCER MODULE

BACKGROUND

The present invention relates generally to transducer systems, and more particularly to a sensor module powered and controlled by light pulses received via optical fiber.

Sensor modules containing transducers, transceivers, and associated microprocessors are commonly used to gather and transmit sensor data from large systems back to central controllers or data concentrators. Most sensor modules require a power source, either in the form of a local energy source (e.g. a long term power storage device such as a chemical battery) or a local connection to a remote energy source (e.g. an AC or DC connection to a local power network or grid). Some systems use photodiodes convert received optical pulses into working voltage.

SUMMARY

In one aspect, the present invention is directed to a sensor assembly comprising a remote data concentrator (RDC) and an optically powered transducer module (OPTM). The RDC transmits first optical pulses including a parameter request signal along an optical fiber. The OPTM is connected to the optical fiber, and comprises a photodiode, an energy storage device, a sensor, a processor, and a laser. The photodiode receives the first optical pulse, and the energy storage device is charged by the photodiode. The sensor, processor, and laser are powered by discharging the energy storage device. The OPTM senses a parameter specified by the parameter request signal from the RDC. The processor generates a signal packet from the output of the sensor as requested by the RDC.

In another aspect, the present invention is directed to an OPTM comprising a plurality of sensors, a photodiode disposed to receive a pulsed light transmission from an optic fiber, an energy storage device, a laser, and a processor. The energy storage device is electrically connected to the photodiode so as to charge from the received pulsed light transmissions. The processor and the laser are powered from the energy storage device, and the laser outputs into the optic fiber. The processor selects and powers one of the plurality of sensors based on the received pulsed light transmissions, generates a signal packet from output of the selected sensor, and transmits the signal packet via the laser after the pulsed light transmission.

In yet another aspect, the present invention is directed to a method of operation for an OPTM comprising a plurality of sensors. The OPTM receives optical pulses from an RDC via an optic fiber. These optical pulses contain a parameter request signal, and are used to charge an energy storage device via a photodiode. Once adequately charged, the energy storage device powers a sensor to generate a sensor data set, and to transmit sensor data packets via the optic fiber to the RDC.

The present summary is provided only by way of example, and not limitation. Other aspects of the present disclosure will be appreciated in view of the entirety of the present disclosure, including the entire text, claims, and accompanying figures.

Figure 1:
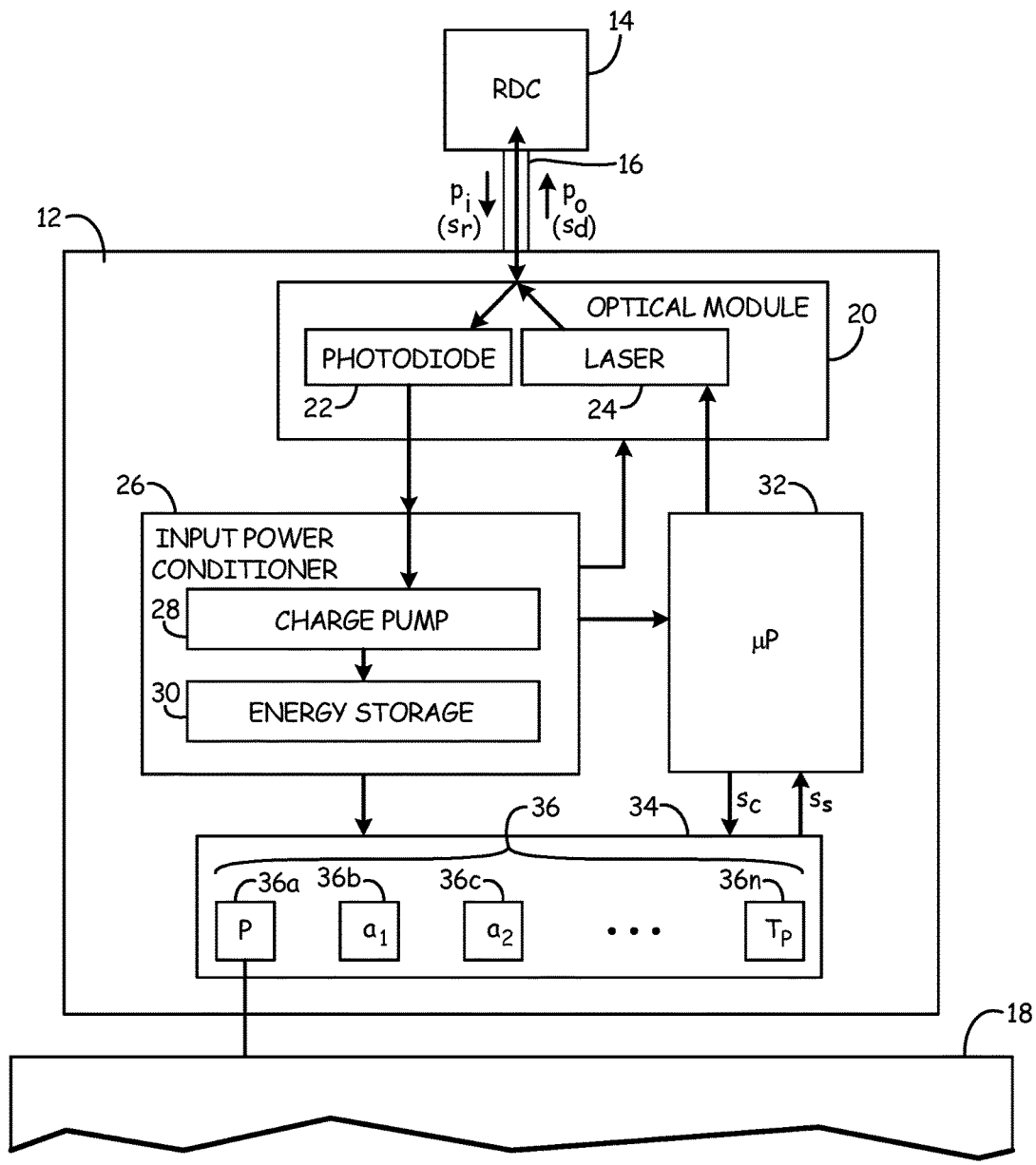
FIG. 1 is a schematic block diagram of a monitoring system including an optically powered transducer module.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

The present invention relates to an optically powered transducer module (OPTM) alternatingly receive and transmit light from and to a remote data concentrator (RDC), respectively. All transmissions to and from the OPTM are carried by a single optical fiber. The OPTM includes a photodiode that converts received light into voltage, a charge pump that charges an onboard energy storage device, and at least one sensor that gathers requested data using power from the energy storage device. An initial received light pulses from the RDC identifies a parameter and powers the OPTM through the process of sensing the parameter, processing the command, and transmitting resulting sensor data optically along the single optical fiber to the RDC. This process repeats, as necessary, for large packets broken into multiple transmissions, and for multiple packets associated with different sensed data.

FIG. 1 is a schematic block diagram of monitoring system 10, which comprises optically powered transducer module (OPTM) 12 and remote data concentrator (RDC) 14, connected by optical fiber 16. RDC 14 is a controller or data collector that requests, receives, and processes sensor signals from OPTM 12. In some embodiments, RDC 14 may receive data from several sensor modules (OPTM 12), which can be situated in diverse locations. OPTM 12 is a sensor module including at least one sensor disposed to monitor a parameter of sensed system 18, and transmit sensor readings back to RDC 14. In the illustrated embodiment, OPTM 12 comprises optical module 20 (with photodiode 22 and laser 24), input power conditioner 26 (with charge pump 28 and energy storage 30), microprocessor 32, optically powered transducer 34, and sensors 36 (including sensors 36a, 36b, 36c, . . . 36n), at least some of which sense parameters of monitored system 18. Sensed system 18 is a system remote from RDC 14 that nevertheless must be monitored by RDC 14 with respect to at least one parameter (e.g. temperature, pressure, acceleration). OPTM 12 receives no external current, and is consequently safe for use and especially desirable in volatile environments, such as near fuel storage and routing apparatus.

OPTM 12 receives optical fiber 16 at optical module 20. Optical fiber 16 is a single-channel optical transmission line disposed to carry pulsed light transmissions between RDC 14 and OPTM 12. Optical module 20 is an optical transceiver disposed to both transmit and receive optical pulses. In the illustrated embodiment, optical module 20 includes photodiode 22 and laser 24. Photodiode 22 converts input light pulses $p_i$ received via optical fiber 16 into voltage, and acts as both a signal and power receiver. Some input pulses $p_i$ can be modulated (e.g. in amplitude, frequency, or pulse width) to carry parameter request signals from RDC 14 specifying a parameter for sensing by one or more of sensors 36. Other input pulses $p_i$ can be unmodulated high-intensity pulses used exclusively to power OPTM 12. Photodiode can, in some embodiments, be shielded or otherwise occluded from ambient light, such that it receives significant light input only in the form of light pulses over optical fiber 16. Laser 24 acts as a signal transmitter, and can for example be a low-power semiconductor laser such as a vertical-cavity surface-emitting laser (VCSEL). In some embodiments, laser 24 and photodiode 22 may be aligned coaxially, e.g. with photodiode 22 surrounding laser 24. In alternative embodiments, optical module 20 may include a beam splitter or functionally similar element directing incoming transmissions to photodiode 22, and outgoing transmissions to from laser 24 to optical fiber 16.

Input power conditioner 26 receives photovoltaically generated direct current (DC) electricity from photodiode 22 of optical module 20, and conditions this power for signal processing by microprocessor 32. Some embodiments of input power conditioner 26 can digitize signals embedded in input pulses $p_i$. In the illustrated embodiment, power conditioner 26 includes charge pump 28 and energy storage device 30. Energy storage device 30 can, for example, be a storage capacitor or supercapacitor, or a rechargeable chemical battery. Charge pump 28 charges energy storage device 30 while photodiode 22 receives input pulses $p_i$, allowing energy storage device 30 to be discharged between input pulses $p_i$ to power microprocessor 32, selected sensors 36 of optically powered transducer 34, and laser 24 of optical module 20. The width and amplitude of input pulses $p_i$ determine a charge accumulated by energy storage device 30. Embodiments of energy storage device 30 with low capacity may need to charge and discharge more than once over the course of processing a signal request embedded in input pulses $p_i$, as described in greater detail below with respect to FIG. 2.

Microprocessor 32 is a logic-capable local processing device with temporary data storage capacity. Microprocessor 32 is configured to receive parameter request signals $s_r$ from RDC 14 embedded in input pulses $p_i$. Parameter request signals $s_r$ can, for example, specify a particular parameter (e.g. temperature, pressure, acceleration) or sensor (e.g. 36a, 36b, ... 36n) to power and poll. Alternatively, parameter request signals $s_r$ can trigger the start of a preprogrammed sequence of polling each or a subset of sensors 36. Microprocessor 32 controls optically powered transducer 34 (via control signal $s_c$) to power at least one selected sensor 36 by discharging energy storage device 30, and receives sensor signals $s_s$ from at least one sensor 36 of optically powered transducer 34 in response. In at least some embodiments, power constraints may only allow one sensor 36 to be powered at a time, even where parameter request signal $s_r$ requests sensor polling from multiple sensors 36. In such cases, microprocessor 32 successively powers single sensors 36 to collect sensor data, pausing as necessary for additional photovoltaic power via additional unmodulated input pulses $p_i$, as described below with respect to FIG. 2. Microprocessor 32 generates a data set including sensor data requested by parameter request signal $s_r$. In some embodiments this dataset may be transmitted entirely by laser 24 as data packet $s_d$. In alternative embodiments, each signal set may be broken down into multiple data packets $s_d$ that are transmitted sequentially, between input pulses $p_i$ necessary to charge energy storage 30 to enable transmission.

Optically powered transducer 34 is a single- or multiple-sensor device with at least one sensor configured to monitor a parameter of sensed system 18. In the illustrated embodiment, optically powered transducer 34 includes sensors 36a, 36b, 36c, and 36c, which are variously illustrated as pressure (P), acceleration ($a_1$ and $a_2$), and temperature ($T_p$) sensors. In general, any collection of local low-power sensors can be included in optically powered transducer 34. In at least one embodiment of the present invention, optically powered transducer 34 includes six distinct sensors: a pressure sensor, a triaxial accelerometer (i.e. 3 accelerometers of spatially diverse orientations), and two temperature sensors used for calibration. One temperature sensor is associated with and co-located adjacent the pressure sensor and one of the accelerometers, so as to permit sensor correction based on temperature fluctuation. In some embodiments, sensor readout correction can be performed at microprocessor 32. In alternative embodiments, complex computations may be left to RDC 14, to conserve power and minimize the required complexity of microprocessor 32. In general, at least one sensor 36 senses a parameter of monitored system 18, while a subset of sensors 36 may sense parameters (e.g. acceleration, temperature) within OPTM 12.

OPTM 12 receives data and power exclusively through input pulses $p_i$, and transmits data exclusively via output pulses $p_o$ along shared optical fiber 16. Consequently, input pulses $p_i$ and output pulses $p_o$ alternate during operation of sensor assembly 10, successively charging energy storage device 30 via input pulses $p_i$ and discharging energy storage device 30 to gather and transmit sensor data via output pulses $p_o$.

Figure 2:
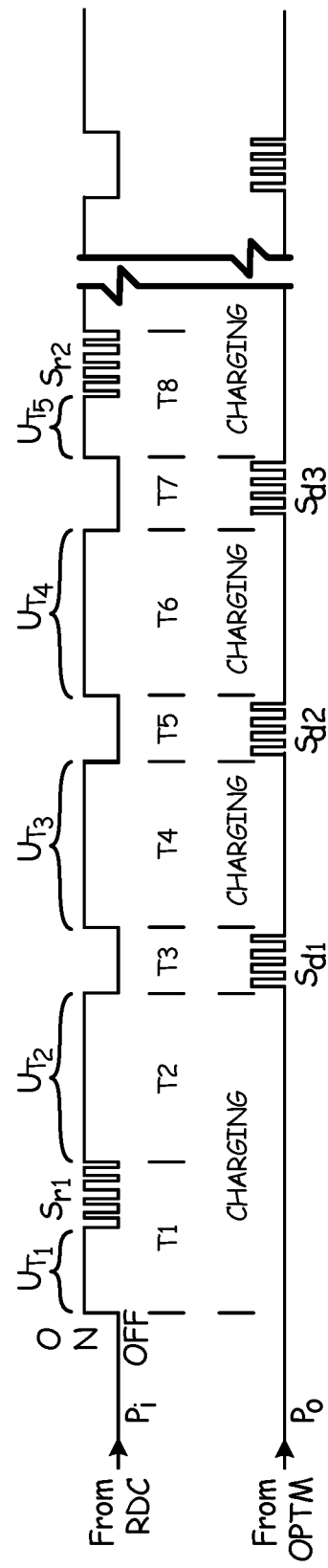
FIG. 2 is a timeline illustrating optical transmission and reception by the optically powered transducer module of FIG. 1.

FIG. 2 depicts timeline 100, which illustrates reception and transmission of input pulses $p_i$ and output pulses $p_o$, respectively. As set forth above with respect to FIG. 1, input and output pulses $p_i$ and $p_o$ are each carried along a shared single-channel optical fiber 16, and originate from RCD 14 and OPTM 12, respectively. In the illustrated embodiment output pulse $p_o$ has non-zero amplitude only for the duration of transmission of data signal $s_d$, which includes at least a part of a sensor data set, as described above. By contrast, input pulse $p_i$ includes high-amplitude unmodulated transmissions (UT) in addition to parameter request signals $s_r$. All electronics of OPTM 12 are powered by photovoltaic DC electricity produced by photodiode 22 from input pulses $p_i$. Accordingly, unmodulated transmissions UT provide photodiode 22 (and thereby energy storage device 30) with additional energy not otherwise adequately supplied by the parameter request data packet $s_r$ portion of input pulse $p_i$, so as to satisfy power requirements of OPTM 12. Energy storage device 30 charges from photodiode 22 over the duration of input pulse $p_i$. Once charged, energy storage device 28 can be discharged to power gathering of sensor data and transmission of data packet $s_d$ by laser 24. Input and output pulses $p_i$ and $p_o$ never occur simultaneously, since optical fiber 16 is shared by both transmissions. In at least some embodiments, input and output pulses $p_i$ and $p_O$ have identical wavelengths, and include pulse width- or amplitude-modulated signals.

As shown in timeline 100, sensor data sets generated by microprocessor 32 from outputs of sensors 36 can be broken down into multiple transmissions of data packet $s_d$. In the illustrated embodiment, OPTM 12 receives input pulses $p_i$ from RDC 14 during periods T1 and T2. Period T1 includes an unmodulated transmission $UT_1$ sufficient to power microprocessor 32 for reception of parameter request signal $s_{r1}$, as well as parameter request packet $s_{r1}$ itself. Period T2 includes only unmodulated transmission $UT_2$, and powers microprocessor 32 for processing of $s_{r1}$ and gathering of requested sensor data. Energy storage device 30 charges from input pulse $p_i$ throughout periods T1 and T2, and discharges during periods T2 and T3 to gather, process, and transmit sensor data via data packet $s_{d1}$. Data packet $s_{d1}$ can, for example, consist of a portion (e.g. 1 first byte) of a data set containing sensor data requested via parameter request signal $s_{r1}$. Gathering this data set and transmitting data packet $s_{d1}$ depletes energy storage device 30, necessitating another unmodulated transmission $UT_3$ of input pulse $p_i$ during period T4 to recharge energy storage device 30, thereby enabling subsequent transmission of a subsequent part of requested data during period T5 via data packet $s_{d2}$ of output pulse $p_o$. In the illustrated embodiment, a further unmodulated transmission UT4 recharges energy storage device 30 for transmission of data packet $s_{d3}$, which can for example be a checksum validating $s_{d1}$ and $s_{d2}$. In some embodiments, this checksum may include an OPTM identification number for use in a system wherein RDC 14 services multiple OPTMs.

In the illustrated embodiment, the process of RDC 14 requesting and OPTM 12 providing sensor data repeats with each parameter request signal $s_r$ (i.e. with $s_{r1}$, $s_{r1}$, etc.). In some embodiments, however, microprocessor 32 may poll successive sensors 34 in a preset sequence in response to a single parameter request signal $s_r$, requiring no further parameter request signals $s_r$ until the sensor polling process is to be repeated. Even if no successive parameter request signals $s_r$ are required for microprocessor 32 to successively poll multiple sensors 36, successive input pulses $p_i$ including unmodulated transmissions UT are required to power OPTM 12 for continued operation.

Figure 3:
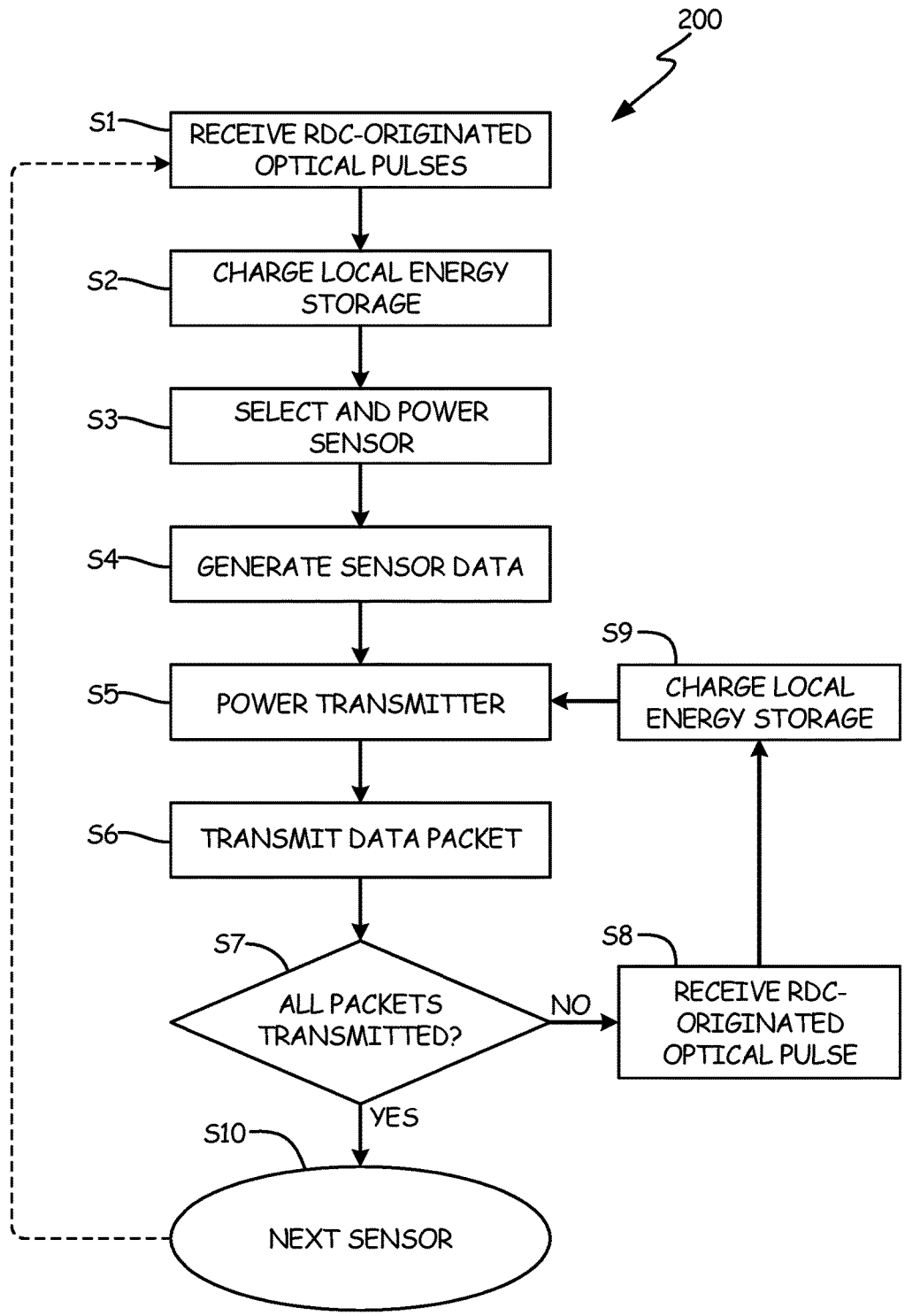
FIG. 3 is a flowchart illustrating a method of operation of the monitoring system of FIG. 1.

FIG. 3 is a flowchart of method 200, a method of operation of monitoring system 10. As described above with respect to FIGS. 1 and 2, optical module 20 of OPTM 12 first receives input pulses $p_i$ from RDC 14 via optical fiber 16. (Step S1). Photodiode 22 and charge pump 28 charge energy storage device 30 from input pulses $p_i$ for the full duration of input pulses $p_1$. (Step S2). Microprocessor 32 selects and powers at least one sensor 36 based on the parameter (e.g. pressure, temperature, acceleration) specified by parameter request signal $s_r$ of input pulses $p_i$. (Step S3) using power from energy storage device 30. Microprocessor 32 then generates a data set of sensor data from the selected sensor. (Step S4). Microprocessor 32 powers laser 24 (Step S5), and transmits data packet $s_d$ in output pulses $p_o$ (Step S6). Data packet $s_d$ includes at least a portion of the data set generated from the specified sensor(s). If all of the data set has not yet been transmitted (Step S7), optical module 20 receives an additional unmodulated transmission UT of input pulse $p_i$ (Step S8) and charges energy storage device 30 with this received light pulse (Step S9), permitting microprocessor 32 to power laser 24 (Step S5) and transmit an additional data packet $s_d$ of the data set (Step S6). This process continues until the entire data set has been transmitted. (Step S7). Once transmission of the full data set requested by parameter request signal $s_r$ has been completed, OPTM 12 becomes inactive until a new request signal $s_r$ (e.g. for polling of a new sensor) is received. (Step S10).

The present invention permits pulsed transmission and reception of data requests and sensor data along a single channel optical fiber 16. Energy storage device 30 permits OPTM 12 to operate using only energy received from input pulses $p_i$ over optical fiber 16, even under circumstances where energy expenditure rates during sensing and transmission exceed energy reception rates at photodiode 22.

Discussion of Possible Embodiments

The following are non-exclusive descriptions of possible embodiments of the present invention.

A sensor assembly comprising: a remote data concentrator (RDC) disposed to transmit a first set of optical pulses along an optical fiber remote from the RDC, the first set of optical pulses including a parameter request signal; an optically powered transducer module (OPTM) connected to the optical fiber, and comprising: a photodiode disposed to receive the first set of optical pulses; an energy storage device configured to be charged by the photodiode; a first sensor powered by discharging the energy storage device and disposed to sense a parameter specified by the parameter request signal; a processor powered by discharging the energy storage device and configured to generate a signal packet from output of the first sensor; and a laser powered by discharging the energy storage device and configured to transmit a second set of optical pulses along the optical fiber to the RDC, the second set of optical pulses including the signal packet.

The sensor assembly of the preceding paragraph can optionally include, additionally and/or alternatively, any one or more of the following features, configurations and/or additional components:

A further embodiment of the foregoing sensor assembly, wherein the OPTM is powered exclusively via the photodiode, by light received through the optical fiber from the remote data concentrator, and wherein the photodiode is configured to receive light only through the optical fiber.

A further embodiment of the foregoing sensor assembly, further comprising a charge pump electrically connecting the photodiode and the energy storage device, and configured to charge the energy storage device from the photodiode during reception of the first set of optical pulses.

A further embodiment of the foregoing sensor assembly, wherein: the OPTM comprises a plurality of sensors configured to sense a plurality of parameters, wherein the plurality of sensors includes the first sensor; and the processor is configured to generate signal packets from the output of any of the plurality of sensors.

A further embodiment of the foregoing sensor assembly, wherein the parameter request signal specifies a requested sensor parameter from among the plurality of parameters, and the processor is configured to identify a sensor configured to sense the requested parameter, from among the plurality of sensors, in response to the parameter request signal, power the identified sensor via the energy storage device, and generate a requested signal packet from the identified sensor.

A further embodiment of the foregoing sensor assembly, wherein the first sensor is a pressure sensor.

A further embodiment of the foregoing sensor assembly, wherein the laser is a vertical-cavity surface-emitting laser (VCSEL).

An optically powered transducer module (OPTM) comprising: a plurality of sensors; a photodiode disposed to receive a pulsed light transmission from an optic fiber; an energy storage device electrically connected to the photodiode so as to charge from the received pulsed light transmissions; a laser powered from the energy storage device and outputting into the optic fiber; and a processor powered from the energy storage device and configured to select and power one of the plurality of sensors based on the received pulsed light transmissions, generate a signal packet from output of the selected sensor, and transmit the signal packet via the laser after the pulsed light transmission.

The OPTM of the preceding paragraph can optionally include, additionally and/or alternatively, any one or more of the following features, configurations and/or additional components:

A further embodiment of the foregoing OPTM, wherein the plurality of sensors comprises a pressure sensor.

A further embodiment of the foregoing OPTM, wherein the plurality of sensors further comprises a temperature sensor.

A further embodiment of the foregoing OPTM, wherein the plurality of sensors further comprises an accelerometer.

A further embodiment of the foregoing OPTM, wherein the energy storage device is a capacitor.

A further embodiment of the foregoing OPTM, further comprising a charge pump disposed between the photodiode and the energy storage device to charge the energy storage device.

A further embodiment of the foregoing OPTM, wherein the laser is a vertical-cavity surface-emitting laser (VCSEL).

A method of operation of an optically powered transducer module (OPTM) comprising a plurality of sensors, the method comprising: receiving a first set of optical pulses from a remote data concentrator (RDC) via an optic fiber, the first set of optical pulses containing a parameter request signal; charging an energy storage device from the first set of optical pulses via a photodiode; once the energy storage device is adequately charged, powering a first sensor from among the plurality of sensors via the energy storage device; generating a first sensor data set from output of the first sensor; and after receiving the first set of optical pulses from the RDC, transmitting a second set of optical pulses containing at least a part of the first sensor data set to the remote data concentrator via the optic fiber, using capacitor charge accumulated from the first set of optical pulses.

The method of the preceding paragraph can optionally include, additionally and/or alternatively, any one or more of the following features, configurations and/or additional components:

A further embodiment of the foregoing method, wherein the second set of optical pulses contains only a first part of the first sensor data set, the method further comprising: receiving a third optical pulse from the remote data concentrator after transmitting the second set of optical pulses, the third optical pulse comprising an unmodulated energy transmission; charging the energy storage device from the third optical pulse via the photodiode; and after the third optical pulse, transmitting a second part of the first data set to the remote data concentrator via the optic fiber, using capacitor charge accumulated from the third optical pulse.

A further embodiment of the foregoing method, further comprising: receiving successive RDC-originated optical pulses via the optic fiber; successively charging the energy storage device from each of the successive RDC-originated optical pulses; successively powering each of the plurality of sensors using capacitor charge accumulated from corresponding successive RDC-originated optical pulses; and transmitting an OPTM-originated optical pulses following each of the RDC-originated optical pulses, each OPTM-originated pulse containing at least part of a sensor data set from a corresponding one of the plurality of sensors, until data from each of the plurality of sensors has been transmitted.

A further embodiment of the foregoing method, wherein the plurality of sensors includes a pressure sensor.

A further embodiment of the foregoing method, wherein the plurality of sensors further includes a temperature sensor, the method further comprising correcting an output of the pressure sensor based on an output of the temperature sensor.

A further embodiment of the foregoing method, wherein charging the energy storage device from the first optical pulse comprises running a charge pump between the photodiode and the energy storage device during the first optical pulse.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by thermal, rotational or vibrational operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A sensor assembly comprising:
   a remote data concentrator (RDC) disposed to transmit a first set of optical pulses and a third optical pulse along an optical fiber remote from the RDC, wherein:
      the first set of optical pulses includes a parameter request signal; and
      the third optical pulse comprises an unmodulated energy transmission; and
   an optically powered transducer module (OPTM) connected to the optical fiber, and comprising:
      a photodiode disposed to receive the first set of optical pulses and the third optical pulse;
      an energy storage device configured to be charged by the photodiode from the first set of optical pulses and the third optical pulse;
      a first sensor powered by discharging the energy storage device once the energy storage device is adequately charged, and disposed to generate first sensor data by sensing a parameter specified by the parameter request signal;
      a processor powered by discharging the energy storage device and configured to generate a signal packet from output of the first sensor; and
      a laser powered by discharging the energy storage device and configured to transmit a second set of optical pulses along the optical fiber to the RDC after the first set of optical pulses is received, the second set of optical pulses including a first part of the first sensor data, and further configured to transmit a second part of the first data to the RDC after the third optical pulse, using capacitor charge accumulated from the third optical pulse.

2. The sensor assembly of claim 1, wherein the OPTM is powered exclusively via the photodiode, by light received through the optical fiber from the remote data concentrator, and wherein the photodiode is configured to receive light only through the optical fiber.

3. The sensor assembly of claim 1, further comprising a charge pump electrically connecting the photodiode and the energy storage device, and configured to charge the energy storage device from the photodiode during reception of the first set of optical pulses.

4. The sensor assembly of claim 1, wherein:
the OPTM comprises a plurality of sensors configured to sense a plurality of parameters, wherein the plurality of sensors includes the first sensor; and
the processor is configured to generate signal packets from the output of any of the plurality of sensors.

5. The sensor assembly of claim 4, wherein the parameter request signal specifies a requested sensor parameter from among the plurality of parameters, and the processor is configured to identify a sensor configured to sense the requested parameter, from among the plurality of sensors, in response to the parameter request signal, power the identified sensor via the energy storage device, and generate a requested signal packet from the identified sensor.

6. The sensor assembly of claim 1, wherein the first sensor is a pressure sensor.

7. The sensor assembly of claim 1, wherein the laser is a vertical-cavity surface-emitting laser (VCSEL).

8. An optically powered transducer module (OPTM) comprising:
a photodiode disposed to receive a pulsed light transmission from remote data concentrator (RDC) via an optic fiber, the pulsed light transmission including a first set of optical pulses containing a parameter request signal, and a third optical pulse comprising an unmodulated energy transmission;
an energy storage device electrically connected to the photodiode so as to charge from the received first set of optical pulses and the third optical pulse;
a plurality of sensors including a first sensor powered via the energy storage device once the energy storage device is adequately charged;
a laser powered from the energy storage device and outputting into the optic fiber; and
a processor powered from the energy storage device and configured to:
generate a first sensor data set from the output of the first sensor;
transmit a second set of pulses from the laser to the RDC via the optic fiber, using capacitor charge accumulated from the first set of optical pulses, the second set of pulses containing a first part of the first sensor data set; and
transmit the second part of the data from the laser to the RDC via the optic fiber, using capacitor charge accumulated from the third optical pulse.

9. The optically powered transducer module of claim 8, wherein the plurality of sensors comprises a pressure sensor.

10. The optically powered transducer module of claim 9, wherein the plurality of sensors further comprises a temperature sensor.

11. The optically powered transducer module of claim 9, wherein the plurality of sensors further comprises an accelerometer.

12. The optically powered transducer module of claim 8, wherein the energy storage device is a capacitor.

13. The optically powered transducer module of claim 8, further comprising a charge pump disposed between the photodiode and the energy storage device to charge the energy storage device.

14. The optically powered transducer module of claim 8, wherein the laser is a vertical-cavity surface-emitting laser (VCSEL).

15. A method of operation of an optically powered transducer module (OPTM) comprising a plurality of sensors, the method comprising:
receiving a first set of optical pulses from a remote data concentrator (RDC) via an optic fiber, the first set of optical pulses containing a parameter request signal and an unmodulated energy transmission;
charging an energy storage device from the first set of optical pulses via a photodiode;
once the energy storage device is adequately charged, powering a first sensor from among the plurality of sensors via the energy storage device;
generating a first sensor data set from output of the first sensor; and
after receiving the first set of optical pulses from the RDC, transmitting a second set of optical pulses containing a first part of the first sensor data set to the remote data concentrator via the optic fiber, using capacitor charge accumulated from the first set of optical pulses;
receiving a third optical pulse from the remote data concentrator after transmitting the second set of optical pulses, the third optical pulse comprising an unmodulated energy transmission;
charging the energy storage device from the third optical pulse via the photodiode; and
after the third optical pulse, transmitting a second part of the first data set to the remote data concentrator via the optic fiber, using capacitor charge accumulated from the third optical pulse.

16. The method of claim 15, further comprising:
receiving successive RDC-originated optical pulses via the optic fiber;
successively charging the energy storage device from each of the successive RDC-originated optical pulses;
successively powering each of the plurality of sensors using capacitor charge accumulated from corresponding successive RDC-originated optical pulses; and
transmitting an OPTM-originated optical pulses following each of the RDC-originated optical pulses, each OPTM-originated pulse containing at least part of a sensor data set from a corresponding one of the plurality of sensors, until data from each of the plurality of sensors has been transmitted.

17. The method of claim 15, wherein the plurality of sensors includes a pressure sensor.

18. The method of claim 17, wherein the plurality of sensors further includes a temperature sensor, the method further comprising correcting an output of the pressure sensor based on an output of the temperature sensor.

19. The method of claim 15, wherein charging the energy storage device from the first optical pulse comprises running a charge pump between the photodiode and the energy storage device during the first optical pulse.

* * * * *